(12) United States Patent
Chen (10) Patent No.: US 7,111,988 B2
(45) Date of Patent: Sep. 26, 2006

(54) DUSTPROOF STRUCTURE FOR A SLEEVE BEARING

(75) Inventor: Wen-Kuan Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 42 days.

(21) Appl. No.: 10/730,075

(22) Filed: Dec. 9, 2003

(65) Prior Publication Data

US 2005/0123224 A1 Jun. 9, 2005

(51) Int. Cl.
*F16C 32/06* (2006.01)
(52) U.S. Cl. .............. 384/119; 384/100; 384/130
(58) Field of Classification Search .............. 384/100, 384/107, 119, 124, 130; 310/90; 360/99.08, 360/98.07
See application file for complete search history.

(56) References Cited

U.S. PATENT DOCUMENTS

| | | | |
|---|---|---|---|
| 6,336,745 B1 | 1/2002 | Horng et al. | |
| 6,435,722 B1 | 8/2002 | Horng | |
| 6,712,514 B1 * | 3/2004 | Mori et al. | 384/107 |
| 2002/0051588 A1 * | 5/2002 | Koseki et al. | 384/100 |
| 2003/0113045 A1 * | 6/2003 | Fujinaka | 384/100 |
| 2004/0017954 A1 * | 1/2004 | Komori et al. | 384/100 |

* cited by examiner

*Primary Examiner*—Thomas R. Hannon
(74) *Attorney, Agent, or Firm*—Bacon & Thomas, PLLC (57) ABSTRACT

A dustproof structure for a sleeve bearing includes an axial tube, a sleeve bearing and a dustproof cushion. The axial tube accommodates the sleeve bearing which bears an axial hole through which a shaft of a motor rotor is freely extended. The dustproof cushion is attached to an end surface of the sleeve bearing to prevent from entering foreign dust. At least one oil-returning groove is formed between the sleeve bearing and the dustproof cushion to ensure cycling lubricant so that sufficient lubricity between the sleeve bearing and the shaft is ensured.

14 Claims, 8 Drawing Sheets

DUSTPROOF STRUCTURE FOR A SLEEVE BEARING

BACKGROUND OF THE INVENTION

1. Field of the Invention

The present invention is related to a dustproof structure for a sleeve bearing. More particularly, the present invention is related to the dustproof structure having a dustproof cushion attached to the oil-impregnated sleeve bearing to thereby ensure circulating lubricant.

2. Description of the Related Art

Figure 1:
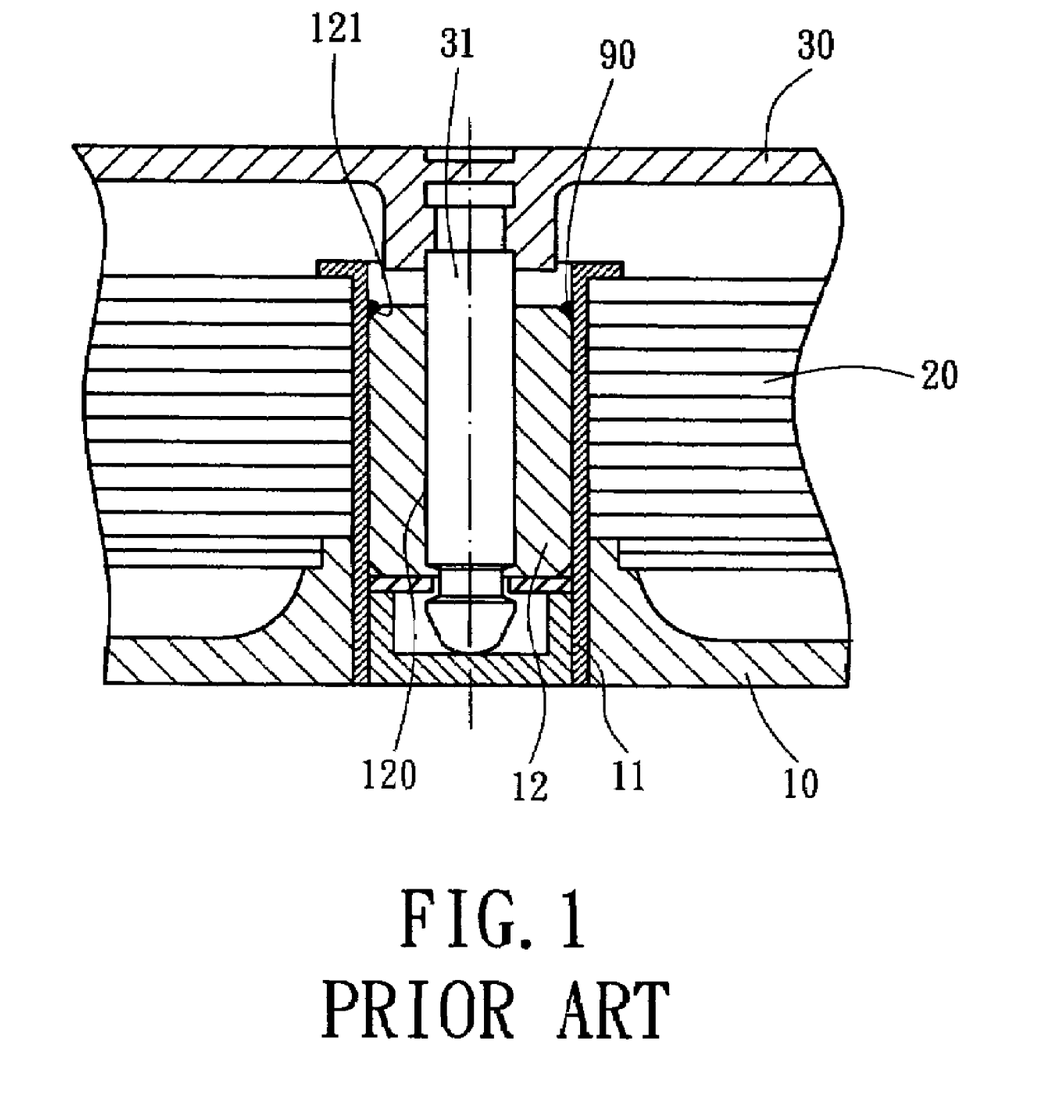
FIG. 1 is a cross-sectional view of a bearing structure for a motor in accordance with the prior art.

Referring to FIG. 1, a conventional bearing structure for a motor consists of an axial seat 10, a motor stator 20, a motor rotor 30. The axial seat 10 is combined with an axial tube 11 in which to accommodate a sleeve bearing 12, and on which to couple the motor stator 20. In assembling, a shaft 31 of the motor rotor 30 extends through an axial hole 120 of the sleeve bearing 12 so that the motor rotor 30 is rotatably connected to the axial seat 10. Generally, lubricant contained in the sleeve bearing 12 may be driven due to rotation of the shaft 31. The lubricant successively flows through an inner circumference of the axial hole 120, an end surface of the sleeve bearing 12, an inclined surface 121 of the sleeve bearing 12, and a gap between the axial tube 11 and the sleeve bearing 12. Finally, the lubricant returns to the inside of the sleeve bearing 12. Thus, the lubricant contained in the sleeve bearing 12 is automatically circulated to maintain the inner circumference of the axial hole 120 so as to attenuate abrasion of the axial hole 120 caused by rotation of the shaft 31. Consequently, it reduces rotational noise and prolongs useful life of the bearing.

Although the lubricant of the sleeve bearing 12 is able to attenuate abrasion, discharging the lubricant from the axial tube 11 is unavoidable while operating. Foreign dust may enter the inside of the sleeve bearing 12 and the gap between the axial tube 11 and the sleeve bearing 12. Thus, it results in precipitation of the foreign dust on the sleeve bearing 12 and the gap between the axial tube 11 and the sleeve bearing 12 that produces greasy dirt 90. Circulating the lubricant on the sleeve bearing 12, the greasy dirt 90 is collected or precipitated in a space formed on the inclined surface 121 of the sleeve bearing 12. Once the greasy dirt 90 enters the gap between the axial tube 11 and the sleeve bearing 12, the circulation of the lubricant can be obstructed. Thus, the lubricant cannot flow freely through between the axial tube 11 and the sleeve bearing 12 and it results in an insufficiency of the lubricant between the axial hole 120 and the shaft 31. The rotational speed of the motor is reduced and the running temperature of the motor is increased. Consequently, the shaft 31 of the motor may be jammed and the useful life of the motor is shortened. Hence, there is a need for an improvement of the conventional bearing structure.

To this end, U.S. Pat. No. 6,336,745, titled "OIL-IMPREGNATED BEARING AND ROTOR SHAFT," and U.S. Pat. No. 6,435,722, titled "COMBINATION STRUCTURE FOR OIL-IMPREGNATED BEARING," discloses a conventional bearing structure include an axial seat, a motor stator, a motor rotor, an axial tube and an oil-impregnated bearing. The bearing structure further includes a cap disposed on an end surface of the oil-impregnated bearing, and a shaft of the motor rotor includes a cushion ring arranged between the cap and the oil-impregnated bearing. The oil-impregnated bearing has a plurality of oil-guiding grooves on its outer circumference for circulating lubricant. In rotational operation, the cap and the cushion ring are commonly used to prevent leaking lubricant from the oil-impregnated bearing, and entering dust into the oil-impregnated bearing. However, the combination of the cap, the cushion ring and the oil-impregnated bearing results in the disadvantage that assembly of the motor's members is complicated. After assembling, an end edge of the cap closely abuts against an end surface of the oil-impregnated bearing, which obstructs lubricant flow to the oil-guiding grooves and reduces efficiency for cycling the lubricant. Thus, it results in an insufficiency of the lubricant between the axial hole and the shaft. The rotational speed of the motor is reduced and the running temperature of the motor is increased. Consequently, the shaft of the motor may be jammed and the useful life of the motor is shortened. Hence, there is a need for an improvement of the conventional bearing structure.

The present invention intends to provide a dustproof structure for a sleeve bearing which includes an axial tube to accommodate a sleeve bearing and a dustproof cushion. At least one oil-returning groove is formed between the sleeve bearing and the dustproof cushion to prevent from entering foreign dust and to ensure cycling the lubricant in such a way to mitigate and overcome the above problem.

SUMMARY OF THE INVENTION

The primary objective of this invention is to provide a dustproof structure for a sleeve bearing, which includes an axial tube to accommodate a sleeve bearing and a dustproof cushion. At least one oil-returning groove is formed between the sleeve bearing and the dustproof cushion to prevent from entering foreign dust and to ensure cycling the lubricant.

The dustproof structure for the sleeve bearing in accordance with the present invention includes an axial tube, a sleeve bearing and a dustproof cushion. The axial tube accommodates the sleeve bearing which bears an axial hole through which a shaft of a motor rotor is freely extended. The dustproof cushion is attached to an end surface of the sleeve bearing to prevent from entering foreign dust. At least one oil-returning groove is formed between the sleeve bearing and the dustproof cushion to ensure cycling lubricant so that sufficient lubricity between the sleeve bearing and the shaft is ensured.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Referring initially to FIGS. 2 through 12, reference numerals of the six embodiments have applied the identical numerals of the conventional bearing structure, as shown in FIG. 1. The bearing structures of the embodiments have the similar configuration and same function as that of the conventional bearing structure and the detailed descriptions are omitted.

Figure 2:
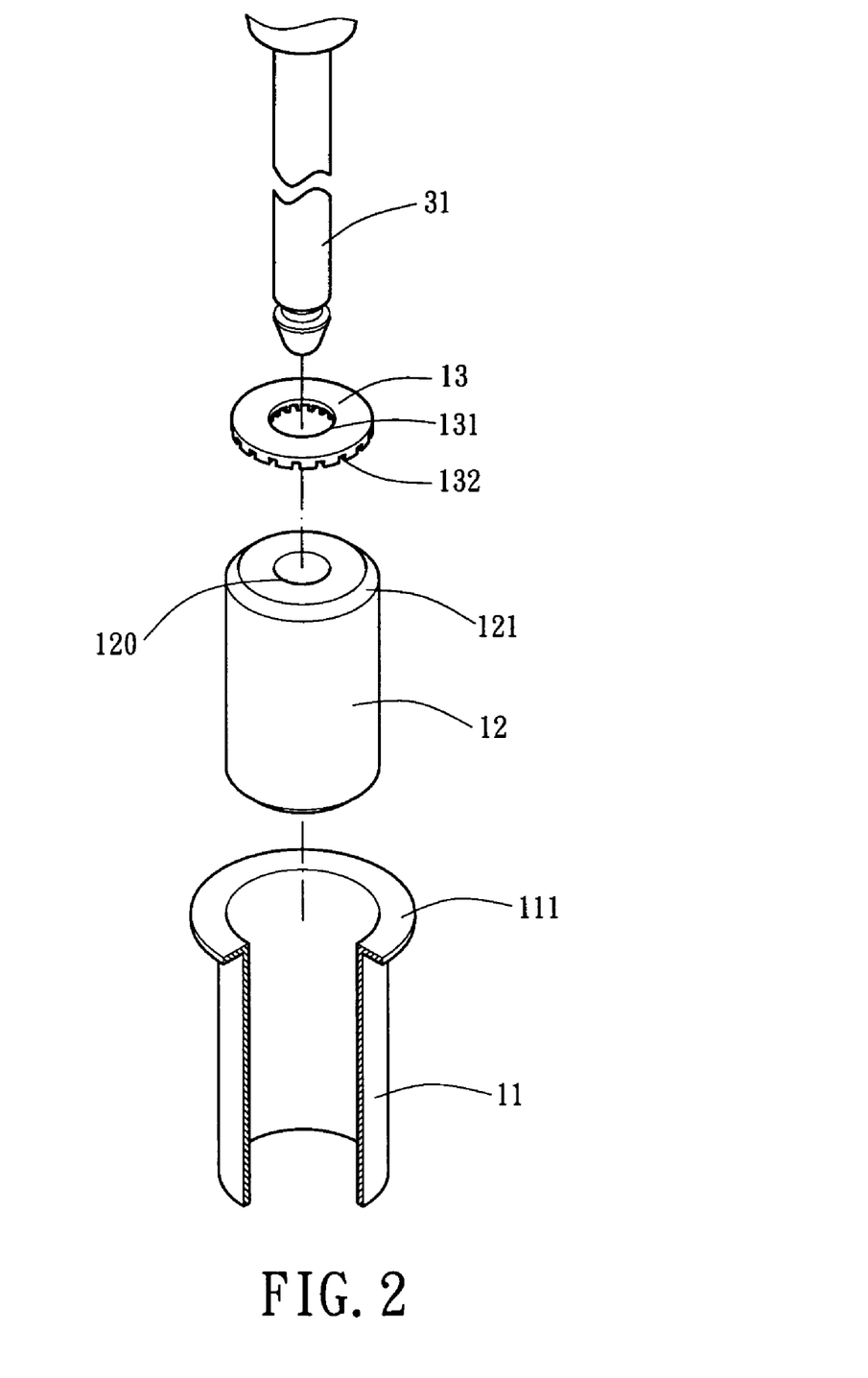
FIG. 2 is an exploded perspective view of a dustproof structure for a sleeve bearing in accordance with a first embodiment of the present invention.
Figure 3:
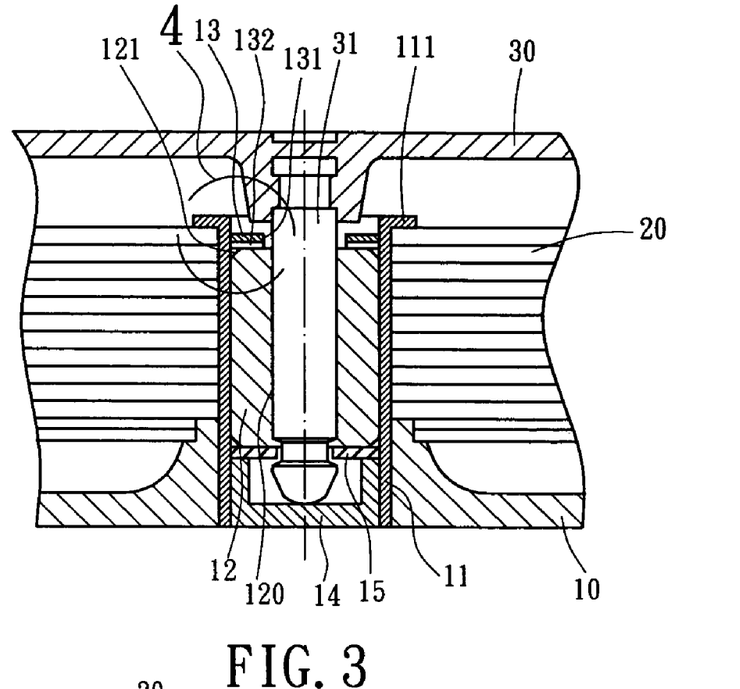
FIG. 3 is a cross-sectional view of the dustproof structure for the sleeve bearing in accordance with the first embodiment of the present invention.

Referring initially to FIGS. 2 and 3, a dustproof structure for a sleeve bearing in accordance with a first embodiment of the present invention includes an axial tube 11, a sleeve bearing 12 and a dustproof cushion 13. The axial tube 11 is a tubular body mounted to an axial seat 10 and has an outer surface and an annular flange 111 at its top end for engaging with a motor stator 20. The axial tube 11 accommodates the sleeve bearing 12 which is an oil-impregnated bearing made of a suitable copper-based material by powder metallurgy or ceramic by sintering. The sleeve bearing 12 bears an axial hole 120 through which a shaft 31 of the motor rotor 30 is freely extended. The sleeve bearing 12 has an inclined surface 121 on its end surface. The dustproof cushion 13 is molded from a suitable plastic or metal material. The dustproof cushion 13 has an axial hole 131 and at least one oil-returning groove 132 or a series of equi-spaced oil-returning grooves 132. The oil-returning 132 is recess on a bottom surface of the dustproof cushion 13 and radially outwardly extended. The dustproof cushion 13 is attached to the end surface of the sleeve bearing 12 to prevent foreign dust from entering, and shaft 31 extends through the axial hole 131 when assembled. Moreover, the axial tube 11 further provides a cap 14 and a retaining member 15 at its bottom end. The cap 14 is used to support an end of the shaft 31 and reservoir lubricant for re-lubrication. The retaining member 15 is used to hold an end of the shaft 31 to prevent disassembly of the motor rotor 10 and motor stator 20.

The detailed operation of the dustproof structure for the sleeve bearing 12 will further be described below.

Figure 4:
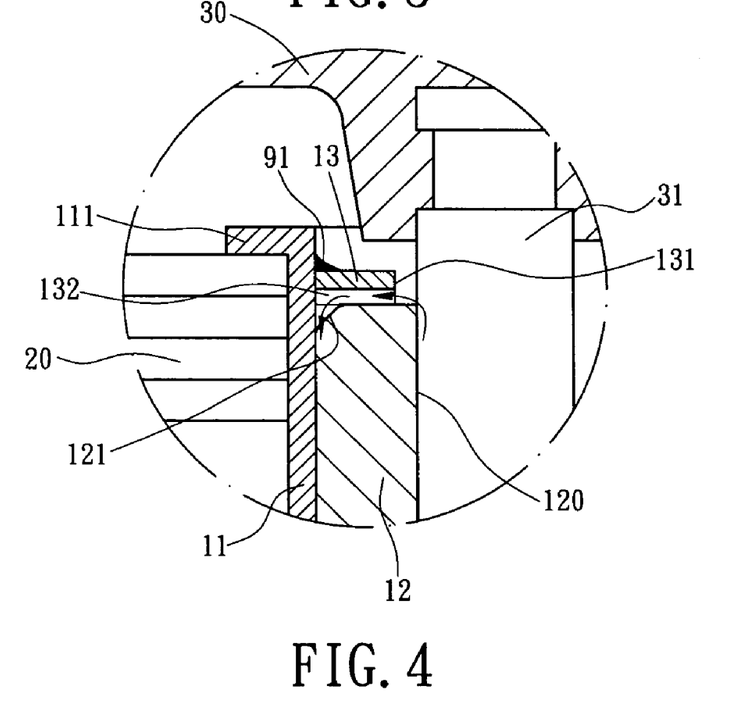
FIG. 4 is an enlarged view, in FIG. 3, of the dustproof structure for the sleeve bearing in accordance with the first embodiment of the present invention.

Turning now to FIGS. 3 and 4, the dustproof cushion 13 is positioned in the axial tube 11, when the axial seat 10, the axial tube 12, the dustproof cushion 13, the cap 14, the retaining member 15, a motor stator 20 and a motor rotor 30 are commonly assembled to constitute a motor. The bottom surface of the dustproof cushion 13 is attached to the end surface of the sleeve bearing 12. The dustproof cushion 13 is able to prevent leaking lubricant from the sleeve bearing 12 and discharging it from the axial tube 11. Meanwhile, once foreign dust enters the axial tube 11, the dustproof cushion 13 is able to prevent it entering into the inside of the sleeve bearing 12, and the gap between the axial tube 11 and the sleeve bearing 12. Furthermore, the oil-returning groove 132 allows lubricant to flow through the end surface and the inclined surface of the sleeve bearing 12 for entering into a gap formed between the axial tube 11 and the sleeve bearing 12. Thus, a circulation of the lubricant is performed so that sufficient lubricity between the sleeve bearing 12 and the shaft 31 is ensured. Consequently, it can avoid abrasion of the axial hole 131 and reduce operational noise to ensure accurate rotational speed and to prolong useful life of the motor.

Figure 5:
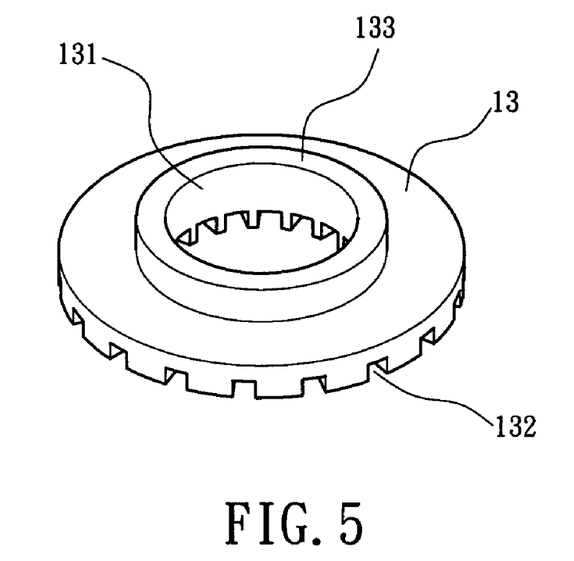
FIG. 5 is a perspective view of a dustproof cushion in accordance with a second embodiment of the present invention.
Figure 6:
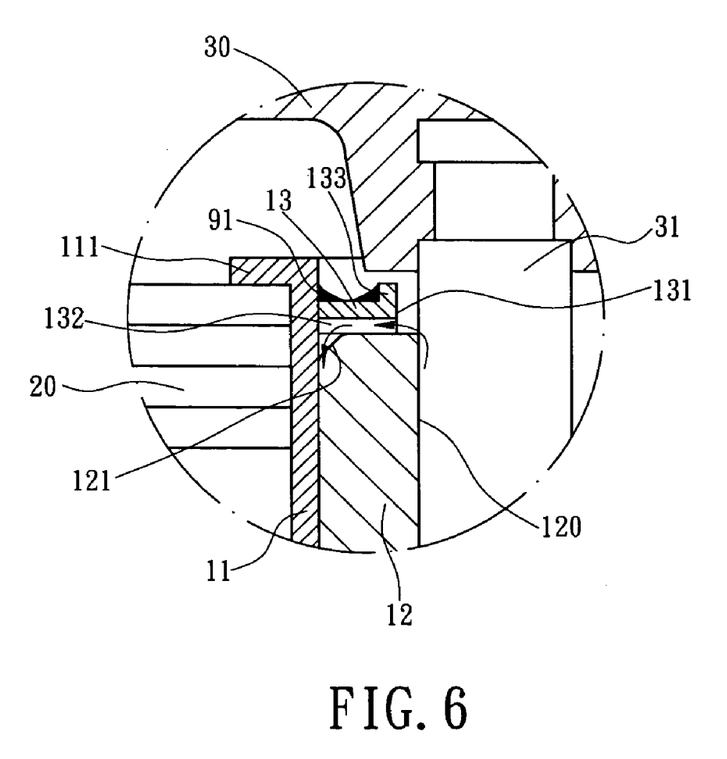
FIG. 6 is an enlarged cross-sectional view of the dustproof structure for the sleeve bearing in accordance with the second embodiment of the present invention.

Turning now to FIGS. 5 and 6, as is known in the first embodiment, a dustproof structure for a sleeve bearing in accordance with a second embodiment of the present invention includes an axial tube 11, a sleeve bearing 12 and a dustproof cushion 13. In comparison with the first embodiment, the dustproof cushion 13 of the second embodiment has an annular wall 133 projected upward from an inner pheriphery of the axial hole 131 that the entire structure is relatively rigid and strong. The annular wall 133 of the dustproof cushion 13 reduces entering foreign dust through the axial hole 131 in normal use and contains the precipitation 91 of dust for preventing obstruction of the circulation of the lubricant. Meanwhile, annular wall 133 of the dustproof cushion 13 also regards as a barrier that prevents discharging the lubricant leaked from the sleeve bearing 12 through the axial hole 131.

Figure 7:
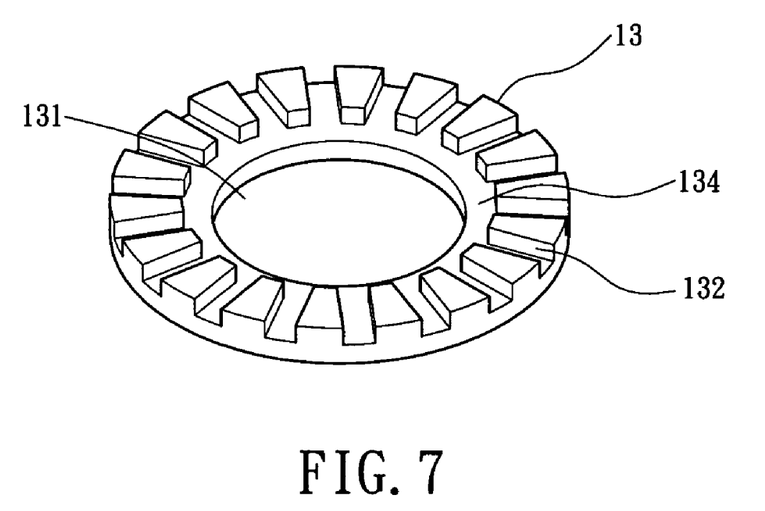
FIG. 7 is a perspective rear view of a dustproof cushion in accordance with a third embodiment of the present invention.
Figure 8:
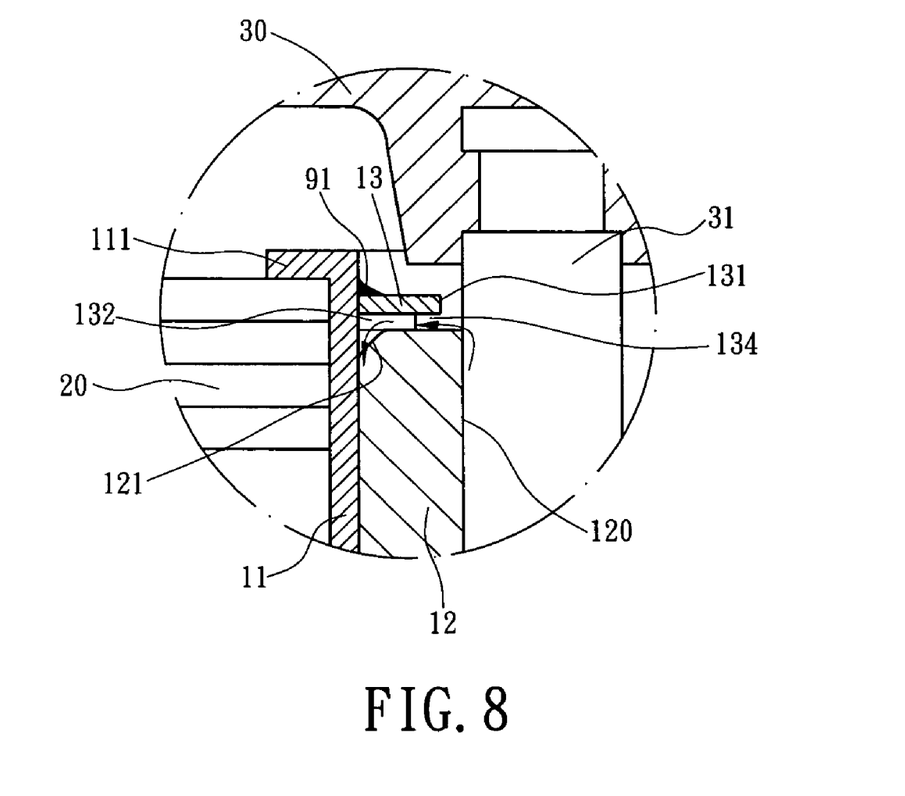
FIG. 8 is an enlarged cross-sectional view of the dustproof structure for the sleeve bearing in accordance with the third embodiment of the present invention.

Turning now to FIGS. 7 and 8, as is known in the first embodiment, a dustproof structure for a sleeve bearing in accordance with a third embodiment of the present invention includes an axial tube 11, a sleeve bearing 12 and a dustproof cushion 13. In comparison with the first embodiment, the dustproof cushion 13 of the third embodiment has a buffer space 134 connected with each end of the oil-returning grooves 132 proximate the axial hole 131. The buffer space 134 extends along the periphery of the axial hole 131. Circulating the lubricant, it initially reservoirs in the buffer space 134 and subsequently flows through the oil-returning grooves 132.

Figure 9:
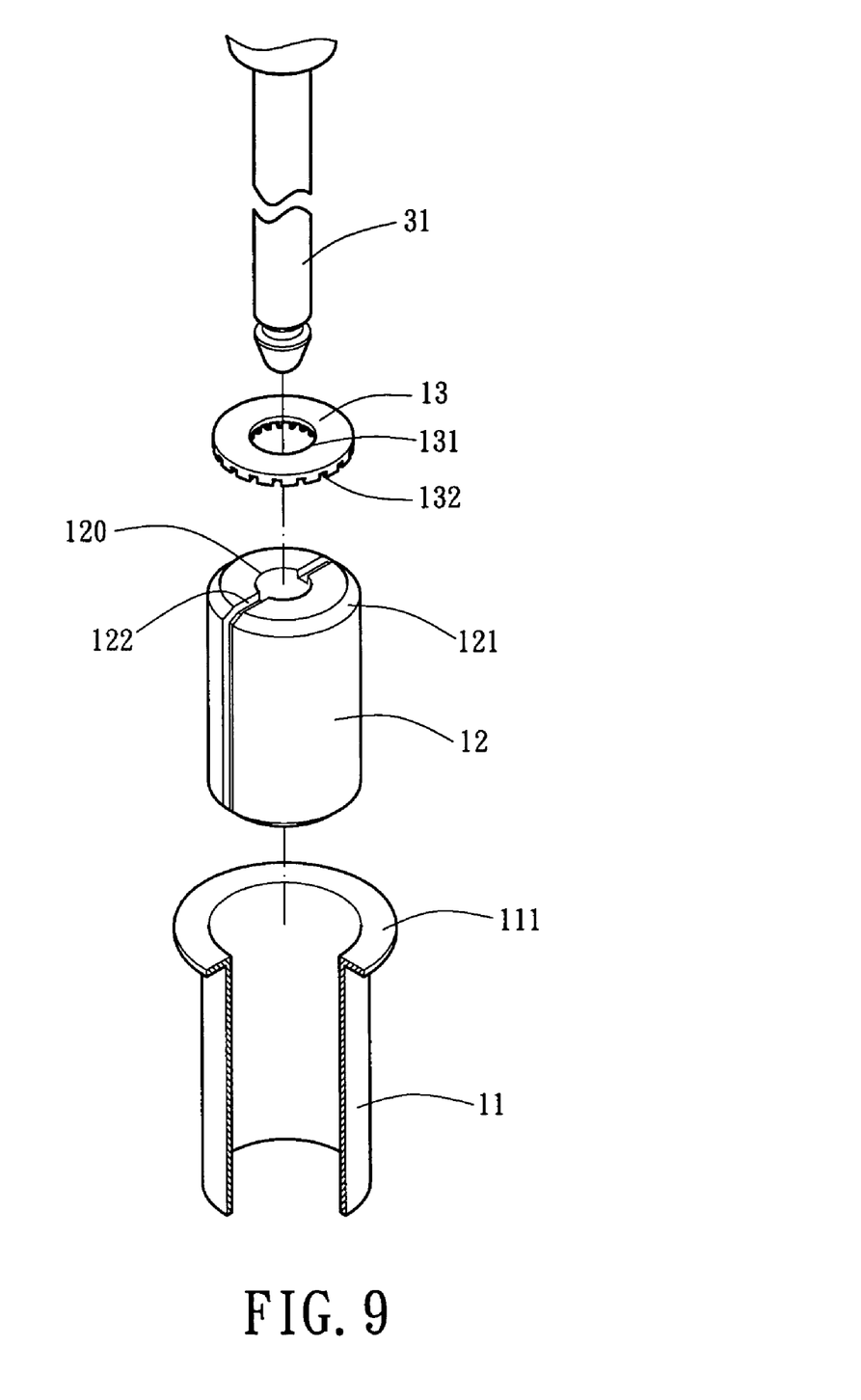
FIG. 9 is an exploded perspective view of a dustproof structure for a sleeve bearing in accordance with a fourth embodiment of the present invention.
Figure 10:
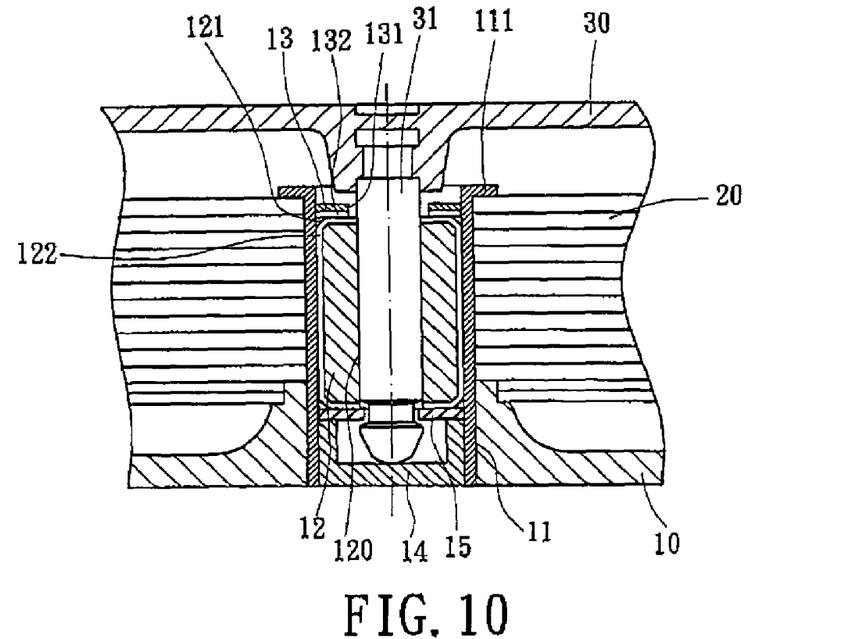
FIG. 10 is a cross-sectional view of the dustproof structure for the sleeve bearing in accordance with the fourth embodiment of the present invention.

Turning now to FIGS. 9 and 10, as is known in the first embodiment, a dustproof structure for a sleeve bearing in accordance with a fourth embodiment of the present invention includes an axial tube 11, a sleeve bearing 12 and a dustproof cushion 13. In comparison with the first embodiment, the sleeve bearing 12 of the fourth embodiment has two oil-returning grooves 122 on its two end surfaces in addition to the oil-returning grooves 132 of dustproof cushion 13. The oil-returning grooves 122 of the sleeve bearing 12 is recessed on either end surface and connected to an oil-guiding groove (not labeled) longitudinally extended on an outer circumference of the sleeve bearing 12. After assembling the dustproof cushion 13 on either end surface of the sleeve bearing 12, the dustproof cushions 13 can prevent foreign dust entering into the sleeve bearing 12 and the oil-returning grooves 122 of the sleeve bearing 12 can enhance circulating the lubricant.

Figure 11:
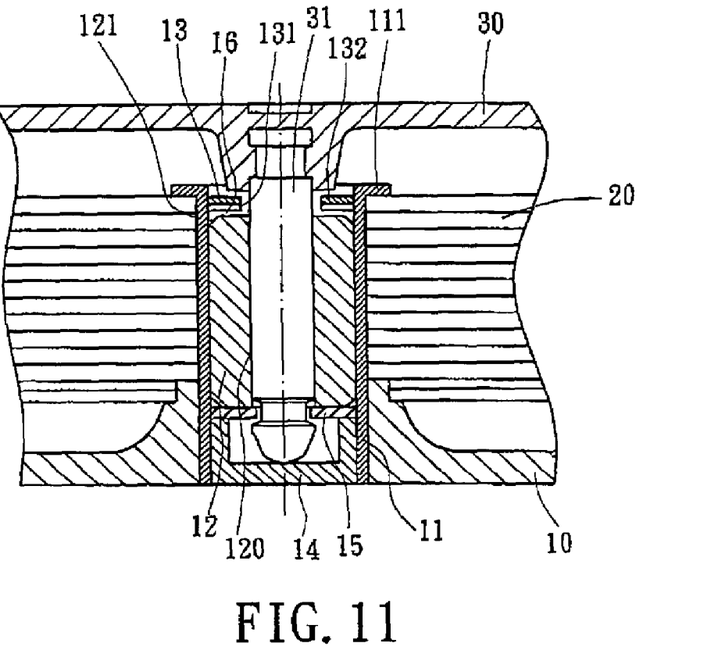
FIG. 11 is a cross-sectional view of a dustproof structure for a sleeve bearing in accordance with a fifth embodiment of the present invention.

Turning now to FIG. 11, as is known in the first embodiment, a dustproof structure for a sleeve bearing in accordance with a fifth embodiment of the present invention includes an axial tube 11, a sleeve bearing 12 and a dustproof cushion 13. The dustproof cushion 13 is integrally formed with or fittingly mounted in the axial tube 11. In comparison with the first embodiment, the dustproof cushion 13 of the fifth embodiment is spaced a predetermined distance from the sleeve bearing 12 so that an oil-returning channel 16 is formed between the end surface of the sleeve bearing 12 and the dustproof cushion 13. The oil-returning channel 16 connects among top portions of the oil-returning grooves 132 to permit returning mass flow of the lubricant. Consequently, the dustproof cushions 13 can prevent foreign dust entering into the sleeve bearing 12 and the oil-returning channel 16 between the sleeve bearing 12 and the dust proof cushion 13 can enhance circulating the lubricant.

Figure 12:
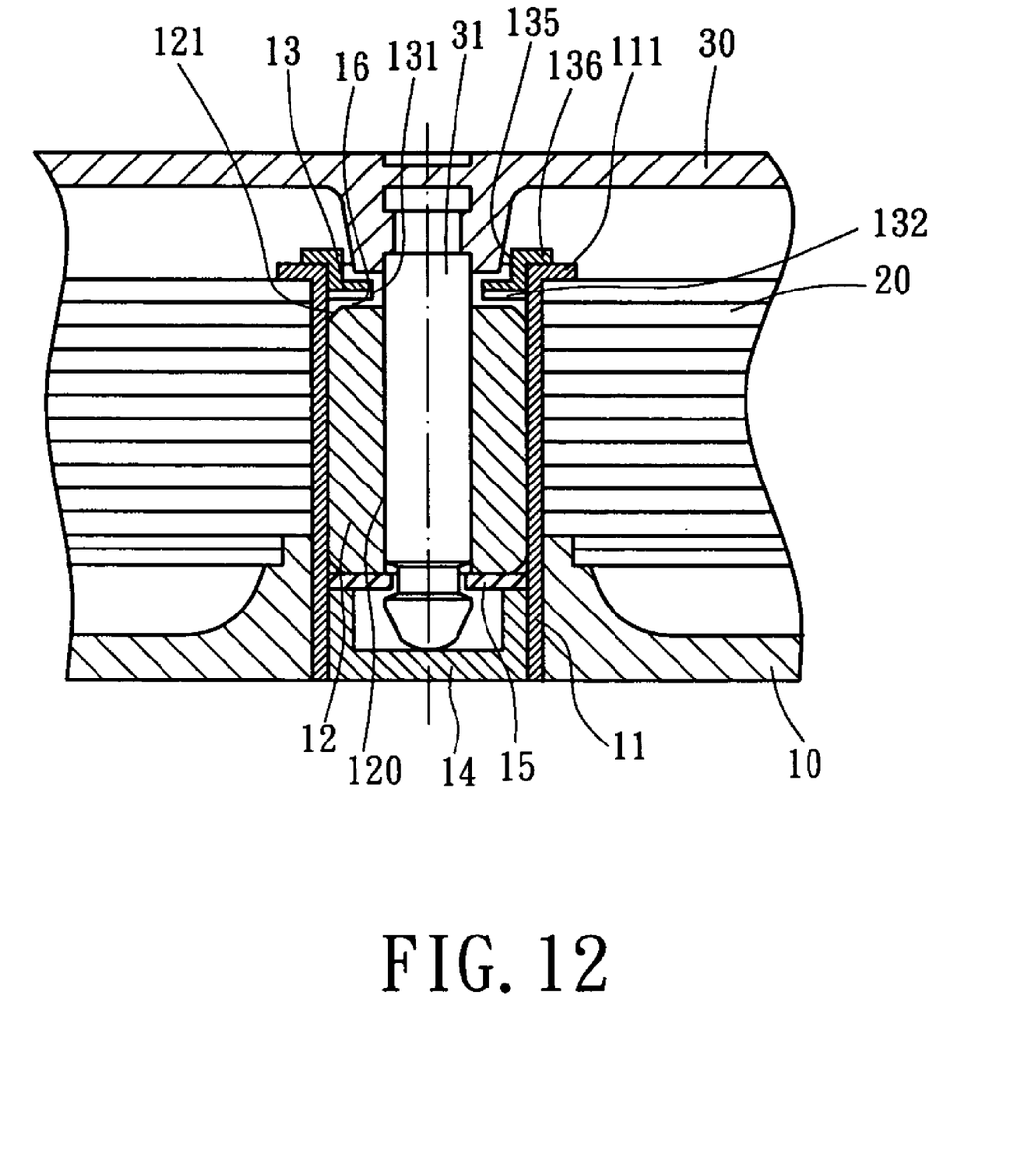
FIG. 12 is a cross-sectional view of a dustproof structure for a sleeve bearing in accordance with a sixth embodiment of the present invention.

Turning now to FIG. 12, as is known in the first embodiment, a dustproof structure for a sleeve bearing in accordance with a sixth embodiment of the present invention includes an axial tube 11, a sleeve bearing 12 and a dustproof cushion 13. In comparison with the first embodiment, the dustproof cushion 13 of the six embodiment has an annular engaging wall 135 and an engaging flange 136 thereof in addition to the oil-returning groove 132. The annular engaging wall 135 is projected upward from an outer periphery of the dustproof cushion 13 while the engaging flange 136 being extended from a top portion of the annular engaging wall 135. In assembling, it is convenient that a top end 111 of the axial tube 11 is abutted against the engaging flange 136 of the dustproof cushion 13 so that the dustproof cushion 13 is spaced from the sleeve bearing 12 to define an oil-returning channel 16. Thereby, it can simplify and speed the assembling operation of the dustproof cushion 13 with the axial tube 11.

The conventional bearing structure, as shown in FIG. 1, may collect greasy dust 90 which obstructs the gap between the axial tube 11 and the sleeve bearing 12. In comparison with the conventional bearing structure, the dustproof cushion 13 of the present invention can prevent foreign dust from entering into the inside of the sleeve bearing 12, and the gap between the axial tube 11 and the sleeve bearing 12. Also, the oil-returning grooves 132 and 122 and the additional oil-returning channel 16 of the present invention can enhance circulating the lubricant. Consequently, it can avoid abrasion of the axial hole 131 and reduce operational noise to ensure accurate rotational speed and to prolong useful life of the motor.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A dustproof structure for a sleeve bearing, comprising:
   an axial tube having a tubular body, said axial tube engaging a motor stator;
   a sleeve bearing mounted in the axial tube, the sleeve bearing including an axial hole through which to extend a shaft of a motor rotor;
   a dustproof cushion received in the axial tube and attached to an end surface of the sleeve bearing for preventing foreign dust from entering into a gap formed between an inner circumference of the axial tube and an outer circumference of the sleeve bearing, the dustproof cushion including an axial hole through which to extend the shaft of the motor rotor, said dustproof cushion further including an annular wall that projects upwardly from an inner periphery of the axial hole; and
   at least one oil returning groove formed on a surface of the dustproof cushion facing the end surface of the sleeve bearing and adapted to re-lubricate an inner circumference of the axial hole of the sleeve bearing.

2. The dustproof structure for a sleeve bearing as defined in claim 1, wherein the oil-returning groove is recessed on the surface of the dustproof cushion and radially extended.

3. The dustproof structure for a sleeve bearing as defined in claim 1, wherein the axial tube further includes an outer surface on which to engage the motor stator.

4. A dustproof structure for a sleeve bearing, comprising:
   an axial tube having a tubular body, said axial tube engaging a motor stator;
   a sleeve bearing mounted in the axial tube, the sleeve bearing including an axial hole through which to extend a shaft of a motor rotor; and
   a dustproof cushion received in the axial tube and attached to an end surface of the sleeve bearing, said dustproof cushion including an axial hole through which to extend the shaft of the motor rotor; said dustproof cushion further including at least one oil-returning groove formed on a surface of the dustproof cushion facing the end surface of the sleeve bearing, and a buffer space connected with an end of the oil-returning grooves proximate the axial hole.

5. The dustproof structure for the sleeve bearing as defined in claim 4, wherein the axial tube further includes an outer surface on which to engage the motor stator.

6. A dustproof structure for a sleeve bearing, comprising:
   an axial tube having a tubular body;
   a sleeve bearing mounted in the axial tube, the sleeve bearing including an axial hole through which to extend a shaft of a motor rotor; and
   a dustproof cushion fittingly mounted in the axial tube, the dustproof cushion being further spaced a predetermined distance from an end surface of the sleeve bearing so that an oil-returning channel is formed between the end surface of the sleeve bearing and the dustproof cushion.

7. The dustproof structure for a sleeve bearing as defined in claim 6, wherein the axial tube further includes an outer surface on which to engage a motor stator.

8. The dustproof structure for the sleeve bearing as defined in claim 6, wherein an oil-returning groove is recessed on the surface of the dustproof cushion and radially extended.

9. A dustproof structure for a sleeve bearing, comprising:
   an axial tube having a tubular body;
   a sleeve bearing mounted in the axial tube, the sleeve bearing including an axial hole through which to extend a shaft of a motor rotor; and
   a dustproof cushion integrally formed with the axial tube, the dustproof cushion being further spaced a predetermined distance from an end surface of the sleeve bearing so that an oil-returning channel is formed between the end surface of the sleeve bearing and the dustproof cushion.

10. The dustproof structure for a sleeve bearing as defined in claim 9, wherein the axial tube further includes an outer surface on which to engage a motor stator.

11. The dustproof structure for the sleeve bearing as defined in claim 9, wherein an oil-returning groove is recessed on the surface of the dustproof cushion and radially extended.

12. A dustproof structure for a sleeve bearing, comprising:
   an axial tube having a tubular body, said axial tube engaging a motor stator;
   a sleeve bearing mounted in the axial tube, the sleeve bearing including an axial hole through which to extend a shaft of a motor rotor;

a dustproof cushion received in the axial tube and attached to an end surface of the sleeve bearing for preventing foreign dust from entering into a gap formed between an inner circumference of the axial tube and an outer circumference of the sleeve bearing, the dustproof cushion including an axial hole through which to extend the shaft of the motor rotor; and at least one oil returning groove formed on a surface of the dustproof cushion facing the end surface of the sleeve bearing and adapted to re-lubricate an inner circumference of the axial hole of the sleeve bearing, wherein the dustproof cushion includes an annular engaging wall and an engaging flange thereof; and the annular engaging wall projects upwardly from an outer periphery of the dustproof cushion while the engaging flange extends from a top portion of the annular engaging wall.

13. The dustproof structure for the sleeve bearing as defined in claim 12, wherein the axial tube further includes an outer surface on which to engage a motor stator.

14. The dustproof structure for the sleeve bearing as defined in claim 12, wherein the oil-returning groove is recessed on the surface of the dustproof cushion and radially extended.

* * * * *